July 3, 1951
R. R. ROOT
2,558,914
DUSTING MACHINE
Filed Sept. 3, 1947
4 Sheets-Sheet 1
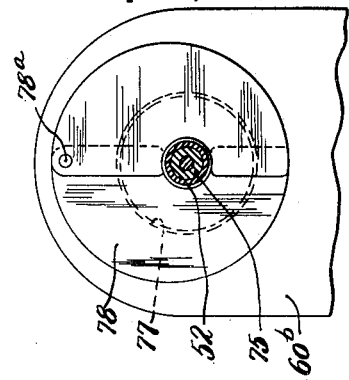
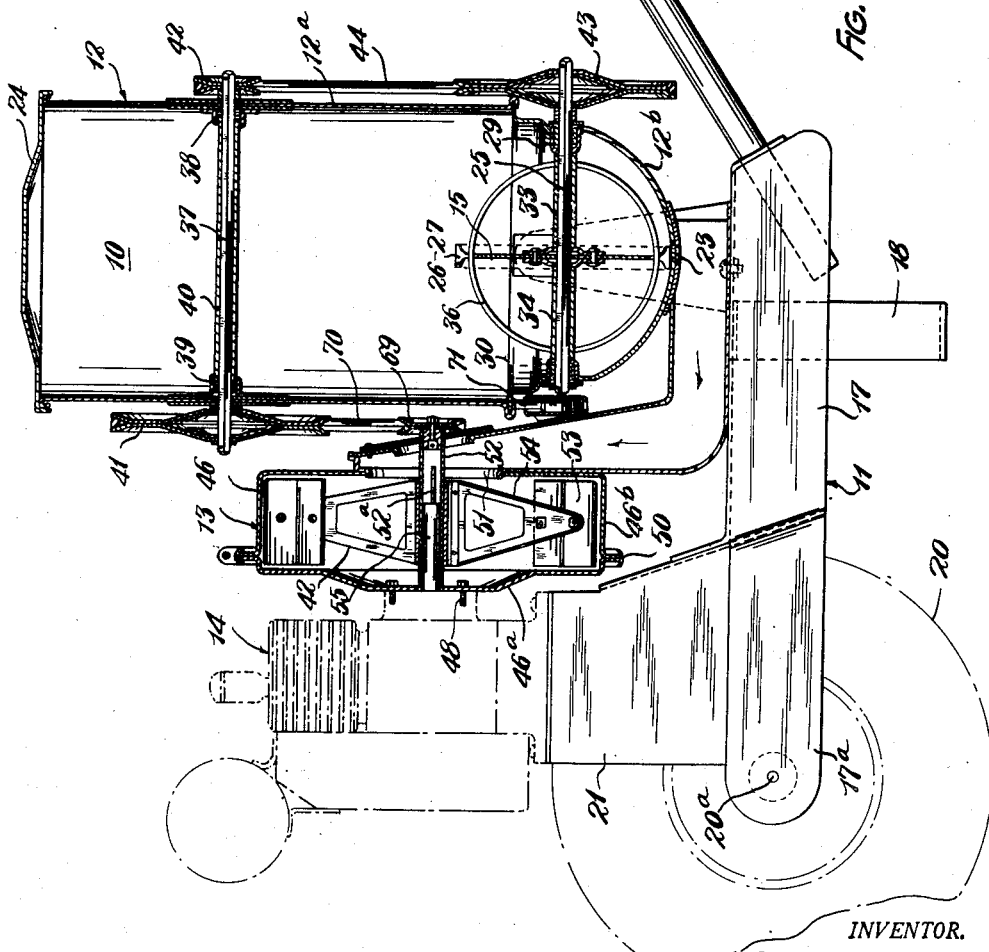
INVENTOR.
RALPH R. ROOT
BY
Kwis, Hudson, Boughton & Williams
ATTORNEYS July 3, 1951 R. R. ROOT 2,558,914
DUSTING MACHINE
Filed Sept. 3, 1947 4 Sheets-Sheet 2
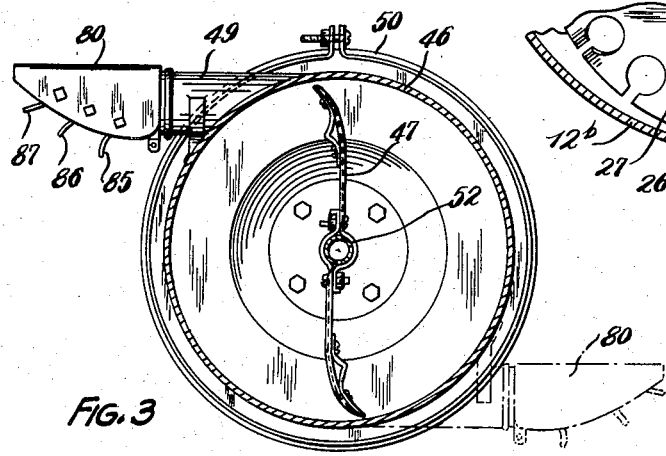
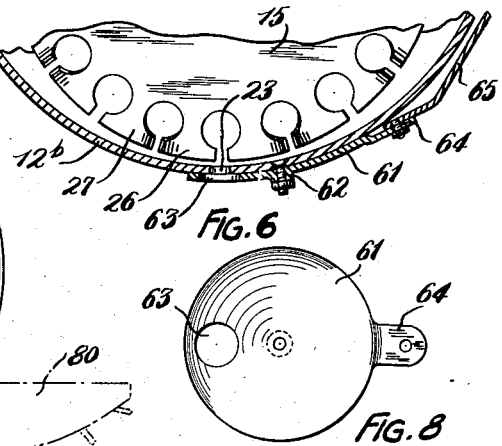
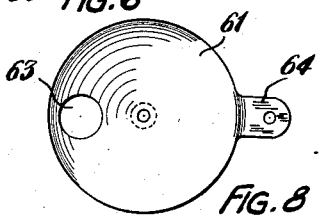
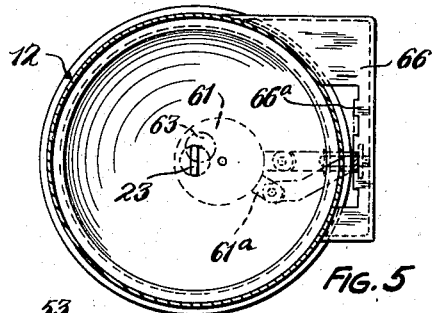
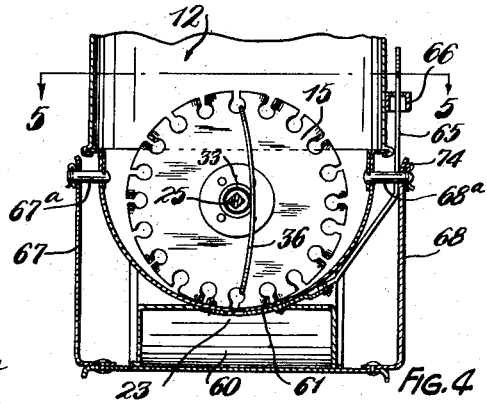
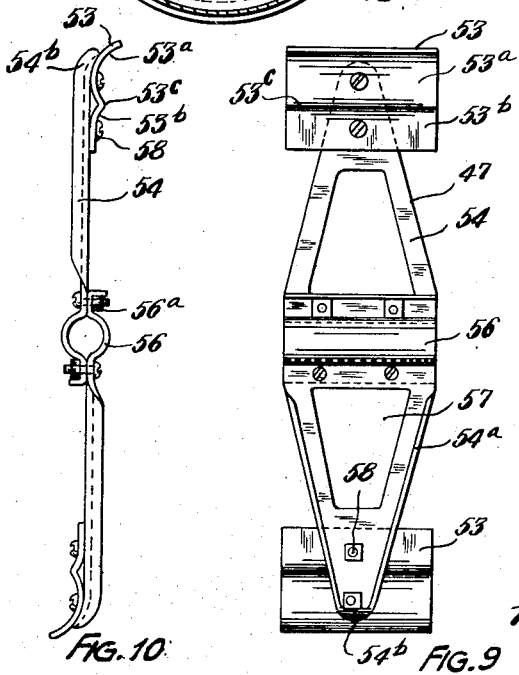
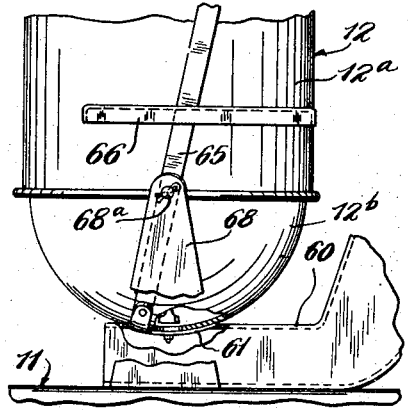
INVENTOR.
RALPH R. ROOT
BY
Kwis, Hudson, Boughton & Williams
ATTORNEYS

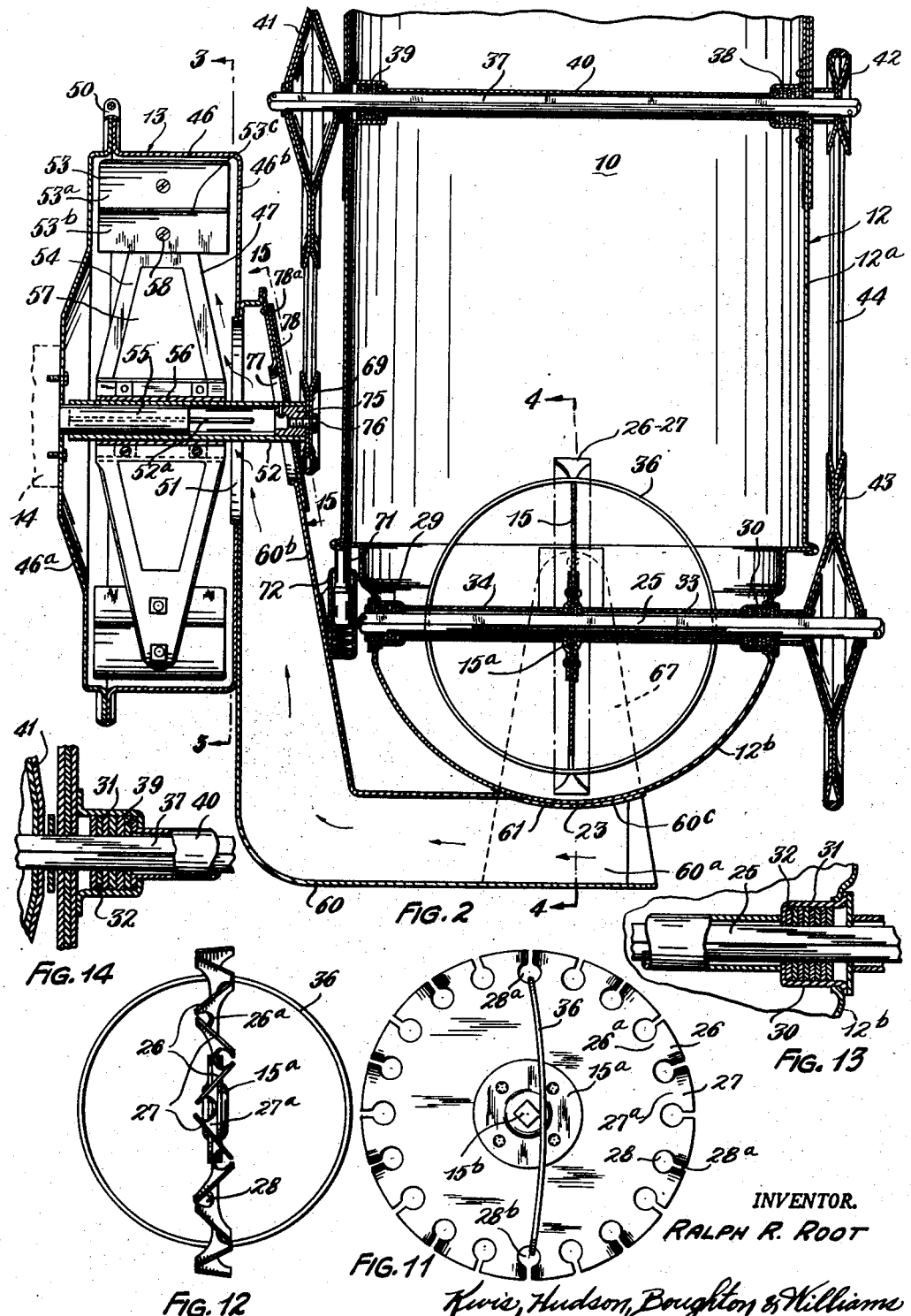

July 3, 1951    R. R. ROOT    2,558,914
DUSTING MACHINE
Filed Sept. 3, 1947    4 Sheets-Sheet 4

INVENTOR.
RALPH R. ROOT
BY
Kwis, Hudson, Boughton & Williams
ATTORNEYS

Patented July 3, 1951

2,558,914

UNITED STATES PATENT OFFICE 2,558,914

DUSTING MACHINE

Ralph R. Root, Lakewood, Ohio

Application September 3, 1947, Serial No. 771,952

3 Claims. (Cl. 43—148)

This invention relates to dusting apparatus for applying insecticide and/or fungicide dust to vegetation and, as one of its objects, aims to provide an improved machine for this purpose.

Numerous machines have been proposed heretofore for applying dust to vegetation, some of which machines have been manually operable while others have been power operated. The manually operable dusters have usually been of a small size so as to be capable of being manually carried and, hence, are so limited as to their capacity and range of use that they are usually considered as being suitable only for light duty and for dusting low-growing vegetation, as distinguished from fruit trees and the like. Power operated dusters have a much greater capacity and a wider range of use, which makes them suitable for dusting fruit trees as well as ground crops and other low-growing vegetation. However, the successful operation of a power duster, particularly for treating fruit trees and the like, usually requires a minimum of two operators, one to steer or otherwise control the travel of the machine along the ground, and the other to handle or control the delivery means or nozzle so that the dust stream will be properly directed against the trees. In order to obtain a range of distribution commensurate with the capacity of the power operated mechanism, many power dusters include a boom, or the like, on which one or more nozzles is mounted, but such a boom further renders a duster very cumbersome to control and operate.

As another of its objects, the present invention provides an improved dusting machine which will be relatively inexpensive to manufacture and can be manually handled by a single operator, but which will nevertheless be very efficient and will have a large capacity and wide range of use, enabling the same to effectively treat trees, as well as ground crops and other low-growing vegetation.

A further object is to provide a so-called "boomless" duster in which a travelling structure movable along the ground carries dust distributing apparatus embodying a power driven blower and in which the dust delivery nozzle is mounted directly on the blower.

Still another object of this invention is to provide such a boomless duster in which the travelling structure is of the wheelbarrow type and is adapted to be manually propelled along the ground during the dusting operation.

Yet another object is to provide an improved dusting apparatus in which the dust hopper and the hopper mounting means are of novel construction and in which a novel agitator means provided in the hopper maintains the dust supply in a loose and free-flowing condition.

As another important object, this invention provides a dusting machine of this character in which dust is fed from the hopper so as to be picked up by, and entrained in, an air intake stream travelling to the blower and which results in a good distribution of the dust particles in the air stream.

This invention also provides a novel construction for the hopper of a dusting machine in which a blade series carried by the periphery of a rotary member traverses a dust feeding opening.

A further object of the invention is to provide a novel duster in which the agitator is belt driven and novel means is employed for causing tightening of the belt.

Yet another object is to provide an improved dusting machine having a novel form of feed valve for controlling the feeding of dust from the hopper.

The present invention also provides a novel construction for the blower of a dusting machine by which an efficient mixing of the dust with the air is obtained and by which an air stream of maximum velocity and volume is obtainable for the power expended by the driving means.

This invention also provides a novel form of nozzle which can be mounted directly on the blower, or used in other ways, and which effectively produces a desired spreading or diffusion of the dust-laden air stream.

Still another object is to provide an improved duster in which the delivery nozzle is mounted on a portion of the blower housing which is relatively shiftable for locating the nozzle in a desired location, or on a particular side of the machine.

Other objects and advantages of the invention will be apparent in the following detailed description and in the accompanying drawings in which:

Fig. 1 is an elevational view of a dusting machine embodying the present invention, the machine being shown with the blower and dust hopper in vertical section;

Fig. 2 is an elevational view also showing the blower and dust hopper in vertical section but on a larger scale than in Fig. 1;

Fig. 3 is a vertical section taken through the blower substantially as indicated by section line 3—3 of Fig. 2;

Fig. 4 is a vertical section taken through the lower portion of the dust hopper, the view being taken in the locality indicated by the section line 4—4 of Fig. 2;

Fig. 5 is a sectional plan view taken through the hopper as indicated by line 5—5 of Fig. 4 with the agitating means omitted;

Fig. 6 is an enlarged sectional detail view showing the cooperation of the agitator with the feeding opening and the rounded bottom of the hopper and also showing the valve means controlling the feeding opening;

Fig. 7 is a partial side elevation further illustrating the hopper mounting and the valve means controlling the dust feeding opening;

Fig. 8 is a plan view showing the feed valve member in detached relation;

Fig. 9 is a front elevation of the impeller of the blower;

Fig. 10 is an edge view of the impeller;

Fig. 11 is an elevational face view of the agitator in detached relation;

Fig. 12 is an edge view of the agitator;

Fig. 13 is a sectional detail view showing one of the bearings for the agitator shaft;

Fig. 14 is a sectional detail view showing one of the bearings for the countershaft of the agitator driving means;

Fig. 15 is a fragmentary elevational view taken on line 15—15 of Fig. 2;

Fig. 19 is a similar diagrammatic view illustrating the use of the duster in treating ground crops or the like.

Figure 17:
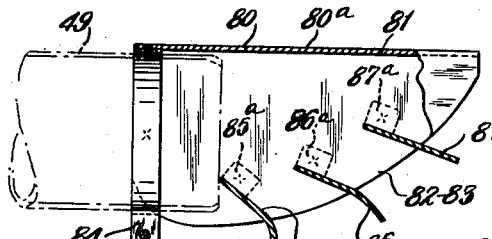
Fig. 17 is a partial longitudinal sectional view taken through the nozzle substantially as indicated by line 17—17 of Fig. 16.
Figure 16:
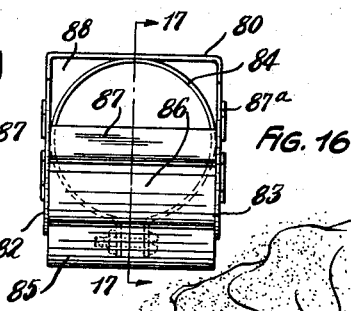
Fig. 16 is an end view of the delivery nozzle for the dust-laden air stream.

In the embodiment of the invention illustrated in the drawings, the improved duster 10 comprises, in general, a travelling carriage 11, a hopper 12 adapted to contain a supply of dust, a blower 13 which is operable to deliver a dust-laden air stream and a power device 14 for driving the blower 13 and an agitator 15 contained in the hopper. The carriage 11 is of the type adapted to be manually propelled and, in this instance, is in the form of a wheelbarrow. The power device 14 can be any suitable device capable of delivering the power needed for driving the blower 13 and the agitator 15 and, in this instance, is shown as being an internal combustion engine.

The travelling carriage or wheelbarrow 11 may include a frame 17 having laterally spaced frame members 17a and may be provided with a pair of depending legs 18 and a pair of rearwardly and upwardly extending handles 19. The wheelbarrow may also include a load-supporting wheel 20 located between the frame members 17a and rotatable on an axle shaft 20a to which these frame members are connected. A hollow bracket 21 extending over the wheel 20 forms a support on which the engine 14 is mounted. When the engine 14 is mounted on this bracket the concentrated weight represented by the engine is located at a forward point on the wheelbarrow and facilitates the manual manipulation of the wheelbarrow.

The dust hopper 12 comprises an upright container 12a which, as here shown, may be cylindrical in cross-sectional shape and is of a size to hold a suitable supply of dust. An important feature of the hopper 12 is that the container 12a is provided with a depending rounded bottom 12b having a curvature which corresponds substantially with the curvature of a portion of a sphere. The round bottom 12b is provided with a dust feeding opening 23 which is located substantially on the central vertical axis of the hopper and, in this instance, is in the form of a slot. The open upper end of the hopper 12 can be closed by a suitable cover 24.

Another feature of the invention resides in a novel construction for the agitator 15. This agitator comprises a wheel-like structure, preferably in the form of a sheet metal disk as shown in the drawing, which is supported for rotation in the hopper 12 by the agitator driving shaft 25. The agitator 15 has a hub portion 15a through which the shaft 25 extends and by which the agitator is mounted on this shaft so as to be driven thereby. In this instance the shaft 25 is square in cross-sectional shape and the driving connection with the agitator is obtained by providing the hub 15a with a shaft-receiving opening 15b of a corresponding shape.

The rim portion of the agitator 15 is provided with a peripherially extending series of blades 26 and 27. These blades can be formed integral with the agitator disk by punching an annular series of openings 28 in the disk adjacent the periphery thereof and which include slot extensions 28a. The openings 28 and the slot extensions 28a thereof divide the rim portion of the agitator disk into the blade elements 26 and 27 and also define stem portions 26a and 27a by which the blade elements remain integrally connected with the disk. Alternate blade elements of the series, here designated as the blades 26, are deflected by twisting the stems 26a so that these blades extend in a direction which is inclined to the plane of the disk at an angle of approximately 45°. The blade elements 27 are deflected at a similar angle but extend in a direction which is oppositely inclined relative to the plane of the disk so that the pairs of adjacent blades 26 and 27 of the series have a convergent-divergent relationship, as shown in Fig. 12.

The agitator shaft 25 extends laterally through the depending rounded bottom portion 12b of the hopper 12 and is suitably mounted on the wall thereof as by means of the bearings 29 and 30. As shown in Fig. 13, the bearings 29 and 30 may each comprise a sheet metal sleeve or bearing socket 31 mounted in an opening of the wall of the rounded hopper portion 12b and a group of washers 32 mounted on the shaft 25 and assembled in the recess of the socket 31. The washers 32 have square openings therein to accommodate the shaft 25 and rotate with this shaft and form a journal portion thereon. The circular outer edges of the washers are rotatably supported by the bearing socket 31. The washers 32 can be made of metal, fiber or any other suitable material.

As shown in the drawings, the agitator 15 is located in the lower portion of the hopper 12 so that its bladed rim is in closely spaced relation to the wall of the rounded bottom portion 12b at the position of the dust feeding opening 23. The agitator is maintained at the desired axial position on the shaft 25 by means of the spacer tubes 33 and 34. It will accordingly be seen that during rotation of the agitator by the shaft 25, the blades 26 and 27 will traverse the dust feeding opening 23 in succession. Because of the angular positions at which these blades stand, they will push small quantities of the dust across the feeding opening 23 alternately in opposite directions as they traverse this opening in succession. This action of the agitator blades will cause a substantially constant flow of dust from the feeding opening during the rotation of the agitator. The angularly disposed blades 26 and 27 will also work on the dust supply in the hopper and cause the same to be maintained in a loose and free-flowing condition.

The agitator 15 preferably also includes a ring member 36 which is mounted on the agitator disk by the fact that opposite portions thereof are engaged in a substantially diametrically opposed pair 28a and 28b of the openings 28. The ring member 36 can be constructed as a wire ring or bail which rotates with the agitator and lies substantially in a plane extending normal to the agitator disk. When the agitator disk is in its assembled position on the shaft 25, the ring 36 is sprung or deflected slightly out of a flat plane by its engagement at diametrically spaced points with the spacer sleeves 33 and 34, as shown in Fig. 4. During the rotation of the agitator, the ring member 36 travels through the dust supply and assists the blades 26 and 27 in maintaining the dust in a loose and free-flowing condition.

The shaft 25 on which the agitator 15 is mounted is driven from a countershaft 37, which extends transversely through the upper portion of the hopper 12 and is supported by suitable bearings 38 and 39 mounted in the wall of the hopper. The bearings 38 and 39 may be of a construction similar to the bearings 29 and 30, that is to say, they may include groups of the washers 32 which are mounted on the shaft 37 and rotate therewith. The shaft 37 may be housed in a tube 40 which extends between the bearings 38 and 39 as shown in the drawings. This shaft may be square in cross-section and is of a length such that its ends project outside of the hopper 12 for the mounting of the pulleys 41 and 42 thereon. The pulley 42 is operably connected with a pulley 43 mounted on the agitator shaft 25 by means of a belt 44.

The air stream forming the carrier for the dust is produced by the blower 13, which is here shown as a blower of the centrifugal type. The blower 13 comprises a housing 46 and a rotor 47 operable therein. The blower housing 46 comprises a stationary housing section 46a which may be connected to the frame of the engine 14 as by means of the screws 48 and a housing section 46b which is rotatably adjustable relative to the stationary section 46a. The housing section 46b carries a tangential outlet projection or tube 49 and is arcuately adjustable relative to the stationary section 46a for locating the outlet projection 49 in a desired position. The movable housing section 46b is adapted to be held in the desired position of adjustment by means of a clamping band 50 by which this housing section is connected to the stationary housing section 46a. The housing section 46b is provided with an intake opening 51 in the side wall thereof.

The rotor 47 of the blower 13 comprises a hollow shaft 52 and a plurality of circumferentially spaced blades 53 which are connected with the hollow shaft by the radial arms 54. In this instance, the rotor is provided with only two of the blades 53 and a corresponding number of arms 54, but the rotor could be construced so as to carry a larger number of such blades, if desired. The hollow shaft 52 is split longitudinally, as indicated at 52a, to enable the same to be compressed into driving engagement with the shaft 55 of the engine 14.

The arms 54 of the rotor 47 are relatively wide, generally flat members and may be of a tapered shape so as to have a maximum width at their inner ends for connection with the hollow shaft 52 and a minimum width at their outer ends on which the blades 53 are mounted. The arms 54 can be constructed as sheet metal stampings and preferably have stiffening flanges 54a extending along their side edges. The inner ends of the arms are shaped for complemental cooperation with each other in forming a hub 56 which is adapted to compress the hollow shaft against the driving shaft 55 of the engine by means of the clamping screws 56a.

An important characteristic of the arms 54 is that they are provided with openings 57 between the blades 53 and the hub 56. The openings 57 permit the arms 54 to rotate in the blower housing 46 substantially without resistance from the air contained in the central portion of the housing and without producing a churning of such air which would consume power and accomplish no useful purpose. The openings 57 permit the air in the central portion of the blower housing to pass freely through the arms during the rotation thereof, and this greatly facilitates a free feeding of the air from the intake opening 41 radially outwardly to the blades 53.

The blades 53 of the rotor 47 are also of a novel construction and each of these blades comprises a pair of adjacent or connected transversely curved parallel sections 53a and 53b. The curved shape of the sections 53a and 53b extends for the full axial length of the blade, and the elevated rib portion 53c separating the curved sections also extends for the full axial length of the blade. The blades 53 are connected with the outer ends of the arms 54 as by means of the screws 58 and, if desired, the tips of the arms may have curved integral portions 54b thereon which follow the curvature of the backs of the blade sections 53a. The blades 53 are mounted on the rotor so that the concave faces of the blade sections 53a and 53b are on the leading side with respect to the direction of rotation of the rotor. By reason of the blade construction provided by this invention, the blower 13 operates to deliver a maximum volume of air at a high velocity, in relation to the amount of power required to be supplied by the engine 14.

The air stream which enters the blower housing through the intake opening 51 is conducted to this opening by a conduit or duct 60 which conducts the air stream laterally and upwardly to the blower housing. The duct 60 comprises a substantially horizontal portion 60a which extends laterally beneath the hopper 12 and a substantially vertical portion 60b which extends upwardly to the intake opening 51 of the blower housing 46. The conduit portion 60a extends across the dust feeding opening 23 so that the air stream in flowing past this opening will effectively pick-up the dust which is being discharged downwardly from the hopper through this opening.

The dust feeding opening 23 is controlled by novel valve means which includes a dished valve member 61 pivotally connected with the curved bottom wall of the hopper 12 by means of the screw 62. The curvature of the valve member 61 conforms to the curvature of the rounded bottom 12b of the hopper so that this valve member will fit tightly thereagainst and will have sliding engagement thereon when the valve member is swung on the pivot 62. The valve member is here shown as having an opening 63 therein which registers with or uncovers the feeding opening 23 when the valve member is shifted to the offset position 61a shown in Fig. 5. The valve member 61 has an actuating arm 64 thereon with which the lower end of a suitable lever 65 may be connected. The lever is adapted to be held in different positions corresponding with the desired settings of the valve member by the projections 66a of a bracket 66.

In connection with the feeding opening 23 it should be explained that this opening discharges directly into the air duct 60. As shown in Fig. 2, the top wall of the duct portion 60a has an opening 60c therein which surrounds the feed opening 23 and into which the extreme lower end of the rounded bottom of the hopper snugly engages.

It should also be explained that with the construction above described the air flowing to the blower 13 through the duct must travel in a substantially vertically upward direction through the duct portion 60b. This is important because it requires all of the dust to be air borne by the air stream before the latter reaches the blower 13 and this will insure an initial good distribution of the dust in the air stream and will substantially eliminate any condition of an irregular charging of the air stream with dust.

Another novel feature of the improved duster 10 resides in a pivotal mounting provided for the hopper 12. As shown in the drawings, the wheelbarrow 11 is provided with a pair of upright trunnion brackets 67 and 68 between which the rounded lower portion 12b of the hopper is received. The pivotal mounting includes a pair of trunnion projections or pins 67a and 68a which are mounted in transversely aligned relation on the rounded bottom portion 12b and project outwardly therefrom. The trunnion projections 67a and 68a pivotally engage in openings or bearing elements provided at the upper ends of the trunnion brackets 67 and 68.

The trunnion brackets 67 and 68 and the trunnion projections 67a and 68a form a mounting means for the hopper 12 which permits the latter to be pivotally shifted toward or away from the blower housing 46 to thereby vary the spacing of the pulley 41 of the countershaft 37 with respect to a driving pulley 69 which is connected with the outer end of the hollow shaft 52 of the blower rotor 47. A belt 70 extending around the pulleys 41 and 69 connects the countershaft 37 with the hollow shaft 52 and when the hopper 12 is pivotally shifted away from the blower housing 46, a tightening of the belt on the pulleys 41 and 69 will be produced. For maintaining a desired tension on the belt 70, a spring pressed plunger 71 may be provided to act on the hopper 12, tending to pivotally shift the same in a direction away from the blower housing. The plunger 71 engages the hopper at a point spaced from the axis of the trunnion projections 67a and 68a and, as shown in Fig. 2, may be slidable in a plunger housing 72 which is mounted on air supply duct 60.

One or both of the trunnion brackets 67 and 68 may be of a resilient character so that when one of these brackets is sprung in a direction to increase the spacing therebetween, the corresponding trunnion projection can be disengaged from such one bracket. This will permit the other trunnion projection to be readily disengaged from its bracket, whereupon the hopper 12 can be lifted off the wheelbarrow 11 and can be inverted to dump unused powder out of the same. When the hopper 12 is to be dismounted from the trunnion brackets 67 and 68, the hopper is first swung toward the blower housing 46 against the action of the spring pressed plunger 61 to thereby slacken the belt 70 and permit this belt to be disengaged from the pulley 41.

When the hopper is to be remounted on the trunnion brackets, one of the trunnion projections is engaged in the opening or bearing of the corresponding bracket and by springing the other trunnion bracket outwardly, the other trunnion projection can be engaged in its bearing or opening immediately thereafter. When the belt 70 has been reapplied to the pulley 41, it will be maintained in a desired tight driving engagement with the pulleys by means of the plunger 71. Accidental disengagement of the trunnion projections 67a and 68a from the trunnion brackets can be prevented by providing the trunnion projections with traverse holes at their outer ends through which cotter pins 74 extend. If desired, the actuating lever 65 for the control valve member 61 can be pivotally mounted on the trunnion projection 68a, as shown in Fig. 4.

The pulley 69 for driving the agitator mechanism of the hopper 12 can be connected with the hollow shaft 52 of the blower rotor in any suitable manner. In this instance the hollow shaft is shown as having a plug 75 in its outer end to which the pulley is connected by means of the screw 76. The plug 75 can be riveted or otherwise secured in the hollow shaft 52.

The air intake duct 60 can be provided with a clearance opening 77 of a size to permit the passage of pulley 69 therethrough during assembly. Leakage of air through this opening can be substantially prevented by means of a suitable cover 78. If desired, the cover 78 may be formed by two complemental sections adapted to swing on a common pivot 78a, as shown in Fig. 15.

The dust and air mixture is delivered from the blower housing 46 through the tangential outlet member 49 thereof, as mentioned above. In accordance with another feature of the improved duster 10 a delivery nozzle 80 is mounted directly on the outlet member 49 and directs the dust-laden air stream toward the desired objective.

The nozzle 80 is of a novel construction and, as shown in Figs. 16 and 17, comprises a nozzle body 80a having a top wall 81 and a pair of depending spaced side walls 82 and 83. A clamping band 84, which is spot welded or otherwise connected to the nozzle body 80a adjacent one end thereof, serves to connect the nozzle with the outlet member 49 of the blower 13. The passage defined by the top and side walls of the nozzle body forms a continuation of the passage of the outlet member 49.

The nozzle 80 also includes a group of spaced diverging blades, in this instance three such blades 85, 86 and 87. These blades extend across the passage of the nozzle and are mounted on the side walls 82 and 83. The ends of the blades can be connected with the side walls by providing the blades with tab-like portions or extensions 85a, 86a and 87a which extend through slots in the side walls and are spot welded, or otherwise connected to such side walls. The blades 85, 86 and 87 of the nozzle 80 are located at varying distances from the end of the outlet member 49 and are disposed in progressively offset relation so as to deflect or divert corresponding portions of the dust-laden stream being discharged through the outlet member.

The blades 85, 86 and 87 are disposed in outwardly diverging relation and their effectiveness in deflecting portions of the dust-laden stream can be augmented, if desired, by making these blades of a curved shape. The curvatures may be different for the respective blades and in this instance the blade 85, which is nearest the outlet member 49 of the blower, has the maximum curvature and the blade 87, which is the most remote from the outlet member, has the minimum curvature. Because of the curvature of the blades and their divergent and progressively offset relationship, these blades will cause an effective spreading of the dust-laden air stream being discharged through the outlet member 49 and will accomplish this function without materially decreasing the velocity value or carrying ability of the stream.

When the nozzle body 80 is quadrangular in cross-section and the outlet member 49 is cylindrical in cross-section, as here shown, corner openings 88 are left between these members through which air can flow to augment the volume of the dust-laden stream being discharged from the outlet member 49.

Figure 19:
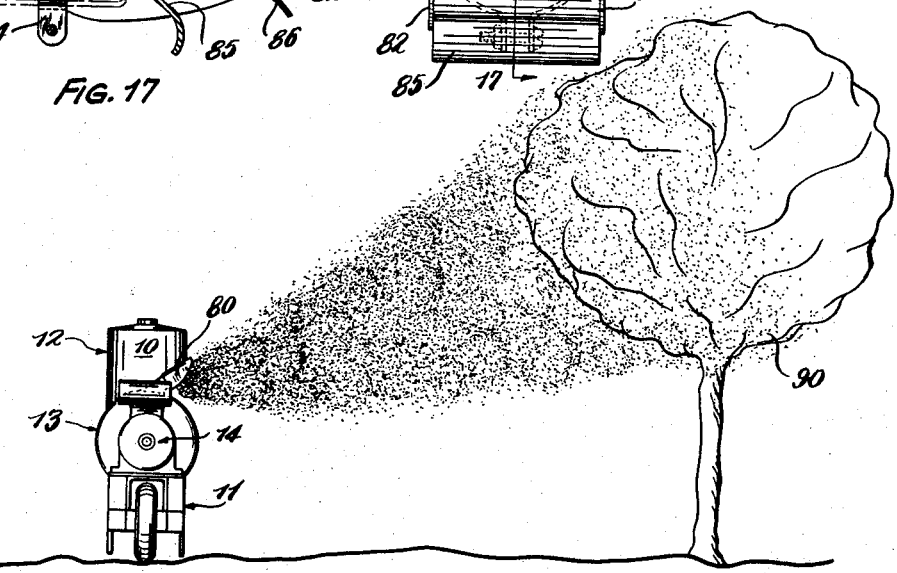
Figure 18:
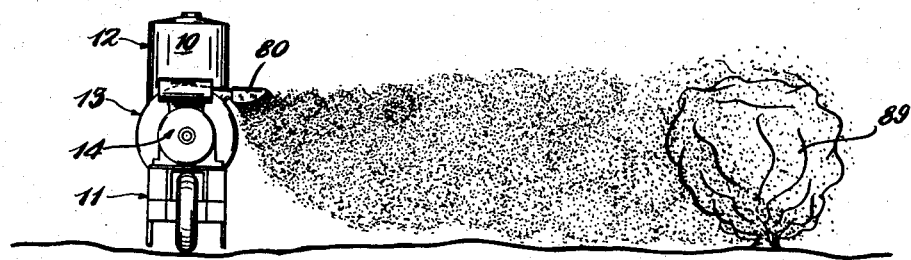
Fig. 18 is a diagrammatic view illustrating the use of the duster in treating trees.

Figs. 18 and 19 show the relatively rotatable blower housing section 46b in different positions of adjustment for locating the nozzle 80 in positions corresponding with different types of dusting to be accomplished. Fig. 18 shows the blower housing section 46b adjusted to a position in which the nozzle 80 extends horizontally from the dusting machine 10. This is the position desirable for the nozzle 80 when low-growing vegetation 89, such as string beans or other ground crops, is being treated. Although the nozzle 80 is shown in Fig. 18 as extending generally horizontally from the duster 10, it may be desirable to have the nozzle occupy a position in which it is depressed approximately 5° below the true horizontal plane. When the nozzle occupies this position the dust-laden air stream will be delivered in a generally horizontal direction as a velocity discharge but by reason of the diverting action of the blades 85, 86 and 87, portions of the stream will be deflected downwardly toward the ground at varying distances outwardly from the duster, with the result that the dust-laden air will be made to roll and boil along the ground and produce an effective coating on both the upper and under surfaces of the leaves of the vegetation being treated.

When the dusting operation is to be carried out on fruit trees 90 or the like, as shown in Fig. 19, the lower housing section 46b is arcuately adjusted to a position in which the nozzle 80 is disposed at approximately a 30° elevation relative to the horizontal plane. When the nozzle is in this position, the velocity stream of dust-laden air will be discharged outwardly and upwardly in a spreading relation and will effectively reach substantially all of the leafy part of the trees being treated.

In using the improved duster 10 it will be understood, of course, that a supply of dust is first placed in the hopper 12 and the driving engine 14 is then started. The operator then shifts the lever 65 to move the valve member 61 to its open position and immediately thereafter grasps the handles 19 of the wheelbarrow 11 and propels the duster in a straight line along the vegetation or trees to be treated. When the end of the row is reached, the operator turns the wheelbarrow 11 around so as to head in the opposite direction and during the return travel dusts another row or swath of the vegetation.

In order to take advantage of any prevailing wind condition, it may be desirable to reverse the nozzle 80 from one side of the duster to the other for such return travel. This is accomplished by rotating the blower housing section 46b through approximatey 180° so as to shift the outlet member 49 from the full line position to the broken line position shown in Fig. 3. In making this adjustment the nozzle 80 is rotated on the outlet member 49 through an angular distance of approximately 180° so that the diverging blades 85, 86 and 87 of the nozzle will always be on the lower side thereof. The rotation of the nozzle on the outlet member 49 is permitted by the loosening of the screw of the clamping band 84.

From the foregoing description and the accompanying drawings it will now be readily understood that this invention provides an improved dusting machine which can be economically manufactured and can be manually propelled and controlled by a single operator. It will also be seen that since the improved duster does not embody a boom, hollow handle or the like, for supporting and manipulating the delivery nozzle, the duster can be conveniently operated in small spaces and is not likely to involve collisions with trees, fences and the like. Moreover, it will be seen that the improved duster embodies a novel form of agitator and agitator driving means by which the dust supply will be effectively maintained in a loose and free-flowing condition and which will facilitate and insure the proper feeding of the dust from the discharge opening of the hopper. It will also be seen that by reason of the novel construction provided for the blower and the delivery nozzle a large volume, high velocity dust delivery will be obtained and the dust stream will effectively reach and treat a row of fruit trees or a large swath of ground crops.

Although the improved duster and its construction and manner of operation have been illustrated and described herein to a detailed extent, it will be understood, of course, that the invention is not to be regarded as limited correspondingly in scope, but includes all changes and modifications coming within the terms of the claims.

Having thus described my invention, I claim:

1. In a dusting machine, a support, a hopper adapted to contain a supply of dust, a blower mounted on said support adjacent said hopper and having an intake opening and a discharge means for discharging a dust and air mixture, means defining an air intake conduit leading to said intake opening, rotary driving means mounted on said support and operably connected with said blower for driving the same, means for feeding dust from said hopper to said intake conduit including a rotary member adapted to be driven, means mounting said hopper on said support for movement relative thereto, belt means connecting said rotary member with said rotary driving means to be driven therefrom, and means tending to impart movement to said hopper relative to said support and in a direction to cause tightening of said belt means.

2. In a dusting machine, a support, a hopper adapted to contain a supply of dust and having a dust feeding opening in a wall thereof, a blower mounted on said support adjacent said hopper and having an intake opening and a discharge means for discharging a dust and air mixture, means defining an air intake conduit leading to said intake opening, rotary driving means mounted on said support and operably connected with said blower for driving the same, an agitator operable in said hopper to cause feeding of dust through said feeding opening to said intake conduit, trunnion means mounting said hopper on said support so as to be capable of pivotal movement relative thereto, belt means connecting said agitator with said rotary driving means to be driven therefrom, and means tending to impart pivotal movement to said hopper relative to said support and in a direction to cause tightening of said belt means.

3. In a dusting apparatus, a hopper adapted to contain a supply of dust and having an opening in the wall thereof for discharging said dust, a rotary shaft extending into said hopper and adapted to be driven, a disk connected with said shaft and having an annular series of openings therein dividing the periphery of the disk into blade elements adapted to traverse said opening, said blade elements being deflected out of the plane of the disk, and a ring member carried by the disk and lying in a plane which extends substantially normal to the plane of the disk, said ring member extending through a substantially diametrically opposed pair of said openings.

RALPH R. ROOT.

REFERENCES CITED

The following references are of record in the file of this patent:

UNITED STATES PATENTS

| Number | Name | Date |
|---|---|---|
| 576,818 | McGraw | Feb. 18, 1897 |
| 616,016 | Ross | Dec. 13, 1898 |
| 956,883 | Boothby | May 3, 1910 |
| 1,368,477 | Brandt | Feb. 15, 1921 |
| 1,464,799 | Anderson | Aug. 14, 1923 |
| 1,556,203 | Clarage | Oct. 6, 1925 |
| 1,557,273 | Secrist | Oct. 13, 1925 |
| 1,619,316 | Root | Mar. 1, 1927 |
| 1,643,317 | Pedelty | Sept. 27, 1927 |
| 1,652,732 | Root | Dec. 13, 1927 |
| 1,674,391 | Dunnagan | June 19, 1928 |
| 1,692,617 | Bowen | Nov. 20, 1928 |
| 1,750,147 | Wright | Mar. 11, 1930 |
| 1,775,911 | Nagel et al. | Sept. 16, 1930 |
| 1,785,932 | Brown | Dec. 23, 1930 |
| 1,785,945 | Ezdorf | Dec. 20, 1930 |
| 1,829,298 | Rimedio | Oct. 27, 1931 |
| 1,852,649 | Gurney | Apr. 5, 1932 |
| 1,858,090 | Hull | May 10, 1932 |
| 1,948,668 | Kuchler | Feb. 27, 1934 |
| 2,174,138 | Sage | Sept. 26, 1939 |
| 2,279,495 | Root | Apr. 14, 1942 |
| 2,293,517 | Messinger | Aug. 18, 1942 |